(12) United States Patent
 Kuncewicz et al.

(10) Patent No.: US 11,992,450 B2
(45) Date of Patent: May 28, 2024

(54) SYSTEMS AND METHODS FOR DRIVING AN ELECTRONIC DEVICE BASED ON A VIDEO FEED

(71) Applicant: AI Video Analysis B.V., Amsterdam (NL)

(72) Inventors: Lukasz Marcin Kuncewicz, Lodz (PL); Aleksei Korepanov, Amsterdam (NL); Toon Timmermans, Amsterdam (NL)

(73) Assignee: AI VIDEO ANALYSIS B.V., Amsterdam (NL)

( * ) Notice: Subject to any disclaimer, the term of this patent is extended or adjusted under 35 U.S.C. 154(b) by 0 days.

(21) Appl. No.: 17/868,640

(22) Filed: Jul. 19, 2022

(65) Prior Publication Data
US 2024/0024190 A1 Jan. 25, 2024

(51) Int. Cl.
| | |
|---|---|
| *A61H 19/00* | (2006.01) |
| *G05B 13/04* | (2006.01) |
| *G06T 7/246* | (2017.01) |
| *G06V 10/774* | (2022.01) |
| *G06V 20/40* | (2022.01) |
| *H04N 21/44* | (2011.01) |

(52) U.S. Cl.
CPC ........... *A61H 19/00* (2013.01); *G05B 13/048* (2013.01); *G06T 7/248* (2017.01); *G06V 10/774* (2022.01); *G06V 20/41* (2022.01); *H04N 21/44008* (2013.01); *G06T 2207/20081* (2013.01)

(58) Field of Classification Search
CPC ........ A61H 23/00; A61H 21/00; A63F 13/285
See application file for complete search history.

(56) References Cited

U.S. PATENT DOCUMENTS

| | | | |
|---|---|---|---|
| 10,051,328 B2 | 8/2018 | Olivares, II | |
| 2014/0207032 A1* | 7/2014 | Dematio | A61H 19/00 601/46 |
| 2015/0366748 A1* | 12/2015 | Cambridge | A61H 19/32 600/38 |
| 2018/0140502 A1* | 5/2018 | Shahoian | A61H 19/44 |
| 2020/0078123 A1* | 3/2020 | Venkataraman | A61B 1/00006 |
| 2020/0099970 A1 | 3/2020 | Sloan | |
| 2020/0219614 A1* | 7/2020 | Bjørkmann | H04L 12/1818 |
| 2020/0253816 A1* | 8/2020 | Sloan | H04N 21/2387 |
| 2022/0071837 A1 | 3/2022 | Sloan | |
| 2022/0151862 A1 | 5/2022 | Smith | |
| 2022/0362095 A1* | 11/2022 | Rabin | A61H 19/30 |
| 2023/0039469 A1* | 2/2023 | Liu | G06F 3/0486 |
| 2023/0277409 A1 | 9/2023 | Sloan | |

* cited by examiner

*Primary Examiner* — Frank Johnson
(74) *Attorney, Agent, or Firm* — Jason P. Mueller; FisherBroyles, LLP

(57) ABSTRACT

A system and method for generating a drive signal for an electronic device provides a drive signal that causes the electronic device to be actuated in synchronization with action in a video feed. A drive signal generator predicts actions that are likely to occur next in the video feed based on an action model for the video feed and based on information about action that recently occurred in the video feed. The predicted future actions are then used to generate the drive signal that is used to actuate the electronic device.

30 Claims, 8 Drawing Sheets

SYSTEMS AND METHODS FOR DRIVING AN ELECTRONIC DEVICE BASED ON A VIDEO FEED

BACKGROUND OF THE INVENTION

In many contexts it is desirable to drive an electronic device in synchronization with action that is occurring in a video feed. One context relates to the adult entertainment industry, where it is desirable to drive an electronic device in synchronization with the action that is occurring in a sexually explicit video feed. The electronic device could be any of multiple different types of electrically driven devices configured to sexually stimulate an individual. Examples include vibrators and male masturbation devices. The general goal is to drive the electronic device so that actuation of the electronic device generally matches or is synchronized with the action occurring in a sexually explicit video feed.

In the case of a previously recorded video, it is possible to review the video and to create a drive signal for an electronic device that matches the action occurring in the video. The drive signal can be synchronized to a time counter in the recorded video. In some instances, the electronic device drive signal can be a channel of data within the video recording itself. When the previously video is played to an individual, the previously generated drive signal is used to drive an electronic device such that the electronic device is actuated in synchronization with the action occurring in the recorded video.

If the case of a live video feed, however, there can be no previously generated electronic device drive signal. The best one can do is to generate a drive signal based on the observed actions in a live video feed and to then attempt to rapidly apply the drive signal to an electronic device. Unfortunately, it is impossible to analyze the action occurring in a live video feed, to generate a drive signal for an electronic device based on the analyzed action and to thereafter communicate and apply the drive signal to an electronic device rapidly enough that the electronic device is actuated in synchronization with the action occurring in the live video feed. The time required to perform the action analysis, to generate the drive signal based on the action analysis and to thereafter communicate the drive signal to the electronic device result in actuation of the electronic device lagging behind the action occurring in the live video feed.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Figure 1:
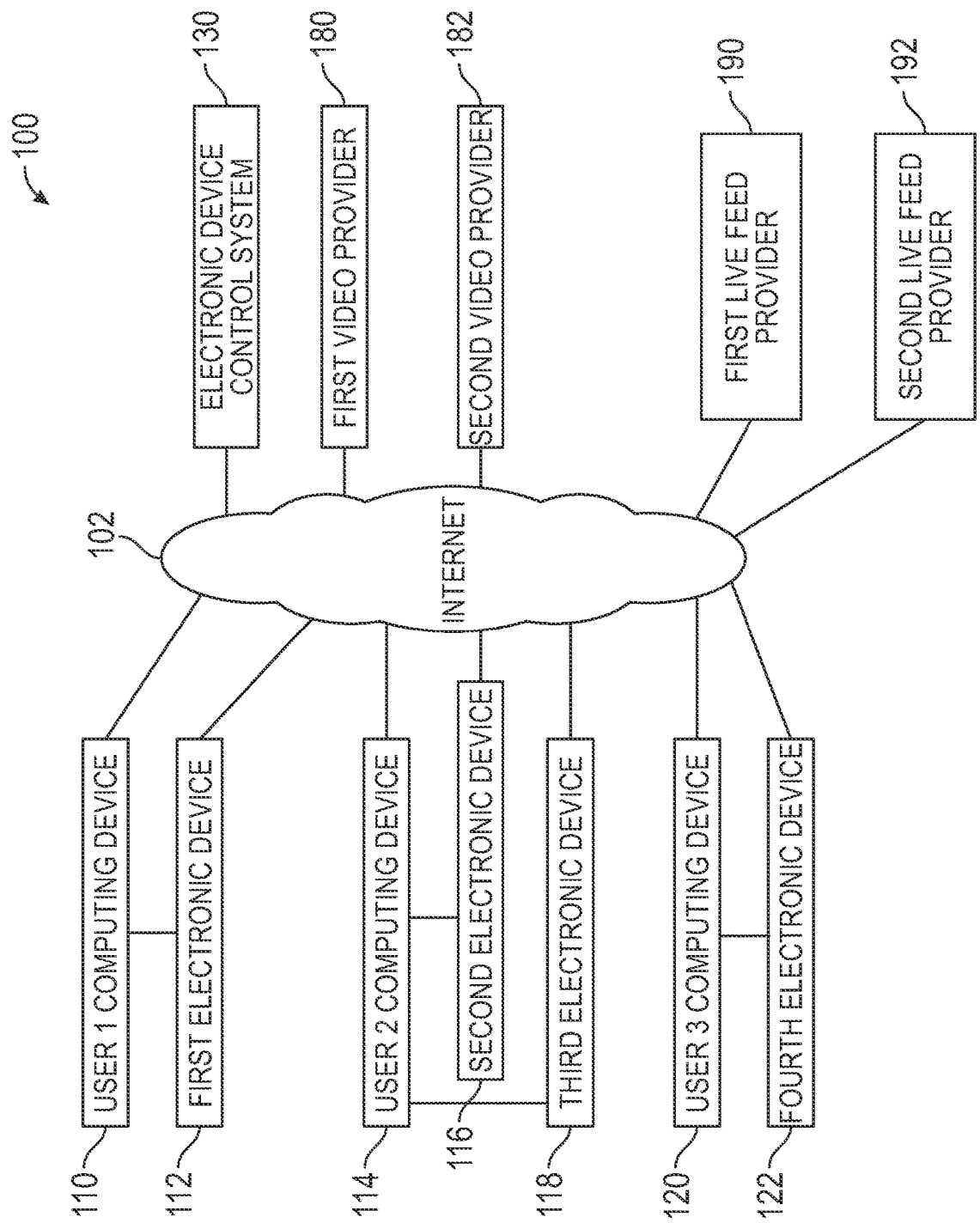
FIG. 1 is a diagram of an environment in which systems and methods embodying the disclosed technology can be utilized.

FIG. 1 illustrates an environment 100 in which systems and methods according to the disclosed technology can be performed. This environment 100 includes a first user computing device 110 that can be used to display a video feed to the first user. The first user computing device 110 could be a desktop or laptop computer, a tablet computing device, a smartphone, a television or monitor, video display devices embedded in other items such as a display screen in a vehicle, or virtually any other type of device capable of displaying a video feed to an individual. The first user computing device 110 may be coupled to and configured to communicate over a data network, such as the Internet 102. For example, the first user computing device 110 could be connected to the Internet 102 via a wired or wireless connection provided by a router or access point (not shown).

FIG. 1 also illustrates that a first electronic device 112 is co-located with the first user computing device 110. The first electronic device 112 could be any sort of electronic device that one wishes to actuate in synchronization with action in a video feed that is displayed via the first user computing device 110. In the case of the adult entertainment industry, the first electronic device 112 could be an electrically operated device configured to sexually stimulate an individual, such as various vibrating devices and male masturbators.

The first electronic device 112 includes a wired and/or wireless interface that allows an external drive signal to be applied to actuate the first electronic device 112. For example, the first electronic device 112 could include a Bluetooth transceiver or a WiFi transceiver that allows the first electronic device 112 to wirelessly communicate with the first user computing device 110. Specifically, the first electronic device 112 could be configured to wirelessly communicate with a software application running on the first user computing device 110, as discussed in greater detail below. This would allow the software application on the first user computer device 110 to deliver a drive signal to the first electronic device 112. The drive signal communicated from the first user computing device 110 to the first electronic device 112 could be one that is generated by the first user computing device 110 itself, or the drive signal could be received from a remote server or computing device via the Internet 102.

A wired or wireless connection between the first user computing device 110 and the first electronic device 112 could allow be used by a software application on the first user computing device 110 to obtain or collect information from the first electronic device 112. As explained in greater detail below, information obtained or collected from the first electronic device 112 could be used to help generate the drive signal that ultimately is used to actuate the first electronic device 112.

Alternatively, the first electronic device 112 could be wirelessly connected to the Internet 102 via a WiFi router, a Bluetooth interface or some other wired or wireless access point (not shown) that allows the first electronic device 112 to communicate over the Internet 102. This would allow a remote server or computing device to send a drive signal directly to the first electronic device 112 via the Internet, thereby bypassing the first user computing device. This would also allow the first electronic device to send or upload information to a remote server or other entity so that such transmitted information could be used to help generate the drive signal that ultimately actuates the first electronic device 112.

Also illustrated in FIG. 1 is a second user computing device 114 that is coupled to a second electronic device 116 and a third electronic device 118. As discussed above, the second and third electronic devices could communicate with the second user computing device 114 via a wired or wireless connection. This allows a software application on the second user computing device 114 to communicate drive signals to the second and third electronic devices 116, 118. Alternatively, one or both of the second and third electronic devices 116, 118 could communicate over the Internet 102 via a wired or wireless interface.

In some instances, the second and third electronic devices are co-located with the second user computing device 114. In other instances, one of the second and third electronic devices 116, 118 may be co-located with the second user computing device 114 and the other of the second and third electronic devices 116, 118 may be situated apart from the second user computing device 114. For example, the second electronic device 116 may be co-located with the second user device 114, and the second electronic device 116 may be communicating wirelessly with a software application on the second user computing device 114. The third electronic device could 118 be located apart from the second user computing device 114, and the third electronic device 118 could be communicating with the software application on the second user computing device 114 via the Internet 102. This would allow the software application on the second user computing device 114 to send drive signals to each of the second and third electronic devices 116, 118, and those drive signals could actuate the second and third electronic devices 116, 118 synchronously with a video feed being displayed by the second user computing device 114. The drive signal sent to the third electronic device 118 via the Internet 102 could be adjusted to account for a small time delay that may occurs as the drive signal traverses the Internet 102 from the second user computing device 114 to the third electronic device 118.

The second electronic device 116 could be configured to sexually stimulate a female, and the third electronic device 118 could be configured to sexually stimulate a male. In that case, different types of drive signals could be provided to each of the second and third electronic devices 116, 118 to actuate the second and third electronic devices synchronously with corresponding separate male and female actions that are occurring in the displayed video feed.

FIG. 1 further illustrates that a third user computing device 120 is co-located with a fourth electronic device 122. Similar to the descriptions provided above, the fourth electronic device 122 could communicate with the third user computing device 120 via a wired or wireless connection, and/or the fourth electronic device 122 could communicate with one or more remote servers via the Internet 102.

In systems and methods according to the disclosed technology, each of the first, second and third user computing devices 110, 114, 120 could be displaying their own individual video feeds. Alternatively, all three of the first, second and third user computing devices 110, 114, 120 could be displaying the same video feed.

FIG. 1 also illustrates an electronic device control system 130 that is connected to the Internet 102. The electronic device control system 130 may be responsible for generating drive signals that are used to drive one of the electronic devices 112, 116, 118, 122. Details of the electronic device control system 130 are provided in the following description.

The environment 100 in FIG. 1 also includes first and second video providers 180, 182. The video providers 180, 182 provide video feeds of previously recorded videos that are displayed by the first, second and third user computing devices 110, 114, 120. The display of video feeds on the user computing devices 110, 114, 120 may be performed by an Internet browser software application running on the user computing devices 110,114, 120. Such a browser software application would navigate to a website maintained and run by one of the video providers 180, 182, and a user would select and play a video offered on such a website.

Alternatively, a specialized software application, possibly provided by one of the video providers 180, 182, could be run on one of the user computing devices 110, 114, 120. The specialized software program would include the capability to download or stream video feed data of a previously recorded videos via the Internet 102 from one or more servers run and maintained by the video providers 180, 182. The specialized software program could then use that obtained video feed data to display video feeds for the user.

In still other instances, a user could utilize a software program running on one of the user computing devices 110, 114, 120 to download video feed data offered by the first and second video providers 180, 182 and then play the downloaded video feed data using any of multiple different video player software applications. This could include downloading video feed data to a network attached storage device, another computing device or a cloud data storage service, and then accessing the stored video feed data via a wired or wireless network connection.

As will be explained in greater detail below, (1) all or portions of the video data being sent to the user computing devices 110, 114, 120; (2) video data that a user computing device obtains from a local or remote data storage device; and (3) video data that is generated by the user computing device itself, such as by paying a video game, may be used by elements of the electronic device control system 130 to generate drive signals that are used to actuate the electronic devices 112, 116, 118, 122. In some instances, electronic device drive information may be included with or paired with the video data for a previously recorded video. When available, such electronic device drive information may be all that is needed to actuate one of the electronic devices 112, 116, 118, 122 synchronously with the display of a video feed. In other instances, electronic device drive information that is included with or paired with previously recorded video feed data may be used by the electronic device control system 130 or by a software program on one of the user computing devices 110, 114, 120 to generate electronic device drive signals that are then used to actuate an electronic device 112, 116, 118, 122 synchronously with display of a video feed.

Also included in the environment 100 is first and second live feed providers 190, 192. The live feed providers 190, 192 deliver video feeds of live performances. The live video feeds transmitted from the first and second live feed providers 190, 192 are displayed in real-time or near-real-time by the user computing devices 110, 114, 120. In some instances, an Internet browser software application on one of the user computing devices 110, 114, 120 may be capable of navigating to a website run and maintained by one of the live feed providers 190, 192 and obtaining and displaying a live video feed provided by one of the live feed providers 190, 192.

In other instances, one of the live feed providers 190, 192 may provide a specialized software application that is downloaded onto and run on one of the user computing devices 110, 114, 120. The specialized software program would then obtain live feed data over the Internet 102 from one or more servers run and maintained by one of the live feed providers 190, 192 and the specialized software program would then use that downloaded live feed data to display a live video feed to the user.

In still other instances, a user might use one or more generally available video player software applications running on one of the user computing devices 110, 114, 120 to obtain live video feed data over the Internet 102 from a server run by one of the live feed providers, and to then display the live feed to the user.

In some instances, the video feed that is displayed to the user may be generated locally by the user computing device itself. This could occur, for example, when the user is paying a video game and the user's own interactions with the video game help to dictate the video that is displayed. Similarly, if a user is playing an interactive video game in which one or more other live or virtual players are also participants, the actions of both the user and the other participants may help to determine the video that is displayed to the user. In these cases, the video feed that is generated as a result of game play could be used by the electronic device control system 130 to generate drive signals that are used to actuate the electronic devices 112, 116, 118, 122.

In still other instances, the video feed from a video camera that is present at the user's location and that is linked to the user's computing device could be used by the electronic device control system 130 to generate drive signals that are used to actuate the electronic devices 112, 116, 118, 122. In this instance, the video feed data will not be received over the Internet 102, but rather would be generated locally.

The video feed might also be the video feed associated with a video call or a video conference call that the user is conducting on his computing device with one or multiple other parties. Here again, the actions of other parties and the actions of the user himself would all contribute to the video feed. The video feed from the video call or video conference call is then used by the electronic device control system 130 to generate drive signals that are used to actuate the electronic devices 112, 116, 118, 122.

As will be explained in greater detail below, all or portions of the live video feed data being sent from the live feed providers 190, 192 to the user computing devices 110, 114, 120 may be used by elements of the electronic device control system 130 or by a software program on one of the user computing devices 110, 114, 120 to generate drive signals that are used to actuate the electronic devices 112, 116, 118, 122. Also, in some instances, one of the live feed providers 190, 192 may provide electronic device drive information along with the data for the live video feed, and that electronic device drive information could alone be used to actuate an electronic device 112, 116, 118, 122 in sync with a live video feed. In yet other instances, such electronic device drive information provided by one of the live video feed providers 190, 192 may be used by the electronic device control system 130 or by a software program running on one of the user computing devices 110, 114, 120 to generate an electronic device drive signal that is used to drive an electronic device 112, 116, 118, 122 in sync with a live video feed.

Figure 2:
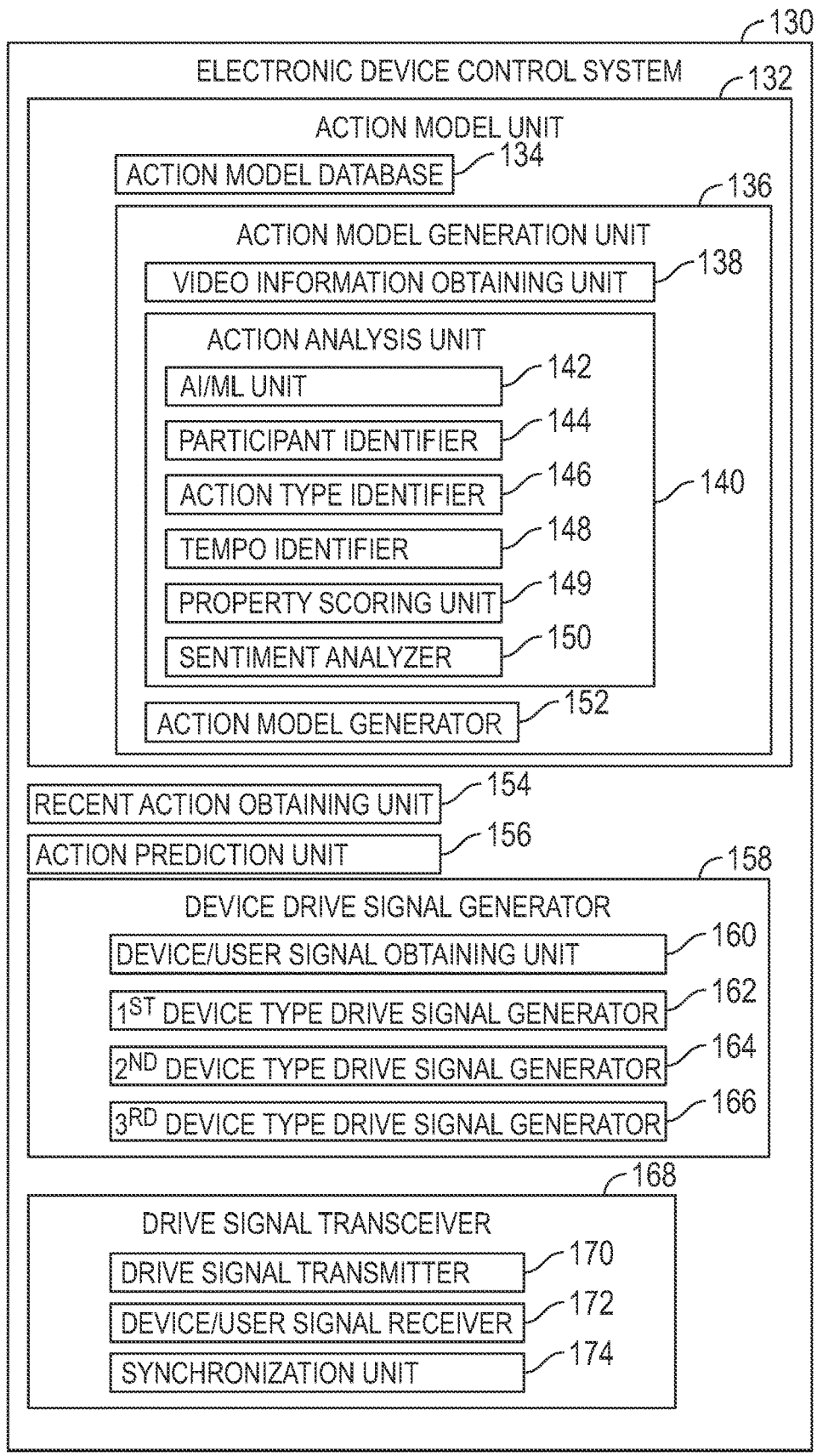
FIG. 2 is a diagram of selected elements of an electronic device control system.

FIG. 2 illustrates selected elements of an electronic device control system 130 that is configured to generate electronic device drive signals. Before discussing the details of the electronic device drive control system 130, it is helpful to provide an overview of how the electronic device control system 130 operates to generate electronic device drive signals.

As mentioned in the background section above, in some instances it is desirable to actuate an electronic device in synchronization with action that is occurring in a video feed. If the video feed is a previously recorded video, it is possible to review the video and to create an electronic device drive signal for an electronic device that matches the action occurring in the video. The drive signal can be synchronized to a time counter in the recorded video. In some instances, the electronic device drive signal can be a channel of data within the video recording itself. Thus, when the video feed of the previously video is played to an individual, the previously generated drive signal can be used to drive an electronic device such that the electronic device is actuated in synchronization with the action occurring in the recorded video.

If the case of a live video feed, however, there can be no previously generated electronic device drive signal. Also, generally speaking, it is impossible to analyze the action occurring in a live video feed, to generate a drive signal for an electronic device based on the analyzed action and to thereafter communicate and apply the drive signal to an electronic device rapidly enough that the electronic device is actuated in synchronization with the action occurring in the live video feed. The time required to perform the action analysis, to generate the drive signal based on the action analysis and to thereafter communicate the drive signal to the electronic device result in actuation of the electronic device lagging behind the action occurring in the live video feed.

An electronic device control system 130 as depicted in FIG. 2 is configured to overcome the drawbacks mentioned above and to generate a drive signal for an electronic device that can be used to actuate an electronic device in synchronization with the action in a live video feed. The electronic device control system 130 does this not by speeding up the analysis of the action in the live video feed and/or the generation and communication of the drive signal, but rather by predicting what is likely to occur next in the live video feed.

At a high level, the electronic device control system 130 first obtains or generates an "action model" for a live video feed that is being displayed to a user. The action model is a model of what is likely to occur in the live video feed. How such an action model is generated or obtained is discussed in detail below. However, once an action model for the live video feed is available, the electronic device control system 130 uses the action model to predict the actions that are likely to occur next in the video feed. This is done by noting the actions that just occurred in the video feed, and then using the action model to predict the next actions that are likely to occur, given the actions that just occurred.

Once a prediction of what actions are likely to occur next have been made, the electronic device control system 130 generates an electronic device control signal that can be used to actuate an electronic device synchronously with the predicted actions that are likely to occur next in the video feed. The electronic device control signal is then transmitted to and applied to an electronic device that an individual is using in conjunction with the display of the live video feed. The timing of the application of that electronic device drive signal to the electronic device may be slightly adjusted using various techniques to ensure that the electronic device is actuated in sync with the action occurring in the live video feed.

The foregoing overview assumed that the video feed being displayed to a user was a live video feed. However, the features of the electronic device control system 130 that enable it to generate an electronic device control signal for a live video feed are equally applicable to a video feed for a previously recorded video. Thus, the same basic operations can be performed by the electronic device control system 130 to generate an electronic device control signal for a previously recorded video. Also, if there is some level of information available for the previously recorded video that is indicative of the actions that occur in the video, that information also can be taken into account by the electronic device control system 130 in generating the electronic device control signal. Indeed, such information would be expected to improve the predictions of future actions, thereby resulting in better synchronization between the actions that occur in the video feed and actuation of an electronic device.

With the foregoing overview, we will now turn to an explanation of selected features of the electronic device control system 130 and how those features operate. Note, however, that the depiction in FIG. 2 and the following description are directed to but one embodiments of an electronic device control system 130. It is possible for an electronic device control system 130 embodying the disclosed technology to include additional elements not illustrated in FIG. 2 and for an electronic device control system 130 embodying the disclosed technology to not include some of the elements illustrated in FIG. 2. Thus, the depiction in FIG. 2 and the following description should in no way be considered limiting.

The electronic device control system 130 includes an action model unit 132 that is responsible for obtaining or generating an action model for a video feed. Once an action model for a video feed has been generated, the action model may be stored in an action model database 134 of the action model unit 132. For example, elements of action model unit 132 can generate an action model for a live video feed as the live video feed occurs. The live video feed can be recorded and stored. Likewise, the action model that is generated for the live video feed can be stored in the action model database 134. As a result, when an individual wishes to replay the recordation of the live video feed, the recorded action model for that live video feed that is stored in the action model database 134 can be retrieved and used to help generate an electronic device drive signal to actuate an electronic device synchronously with the display of the recording of the live video feed.

The action model unit 132 also includes an action model generation unit 136 that is responsible for generating an action model for a video feed. As mentioned above, the video feed could be a live video feed or a video feed of a previously recorded video.

The action model generation unit 136 includes a video information obtaining unit 138 that obtains information about a video feed. The obtained video information is then analyzed by an action analysis unit 140. In some instances, the video information obtaining unit 138 may obtain metadata for a video feed, such as the Title, a genre of the video, the actors appearing in the video feed, the media company that produced and/or distributed the video feed, as well as other such information.

The video information obtaining unit 138 may be configured to seek out information about a particular video feed from public and private third party sources. This can include information about the video feed itself, and information about how other parties rated or characterized the video feed. In some instances, an electronic device drive signal may have been previously created for a video feed, and that previously created electronic device drive signal could be used to drive an electronic device while the video feed is displayed. Alternatively, the previously created electronic device drive signal would be used as input for generating one or more new electronic device drive signals.

The video information obtaining unit 138 also could obtain frames or portions of the video feed for analysis by the action analysis unit 140. In many cases, it is not necessary for the action analysis unit 140 to examine every frame of image data contained in a video feed to determine or identify the action occurring in the video feed. Thus, the video information obtaining unit 138 may sample the data contained in a video feed on a periodic basis and provide the sampled data to the action analysis unit 140. This could include, for example, capturing every fourth frame of image data from the video feed and providing those sampled frames of data to the action analysis unit 140.

As mentioned above, the electronic device control system 130 is configured to generate an electronic device drive signal that is used to actuate an electronic device synchronously with the action in a video feed being displayed to a user. As also described above, the video feed is displayed to the using via a user computing device 110, 114, 120. The video information obtaining unit 138 may obtain video information about the video feed being displayed to the user from the user computing device 110, 114, 120 that is displaying the video feed. Typically, this would involve the software application on the user computing device that is responsible for displaying the video feed to the user sending all or portions of the video feed to the video information obtaining unit 138 via the Internet 102. For example, if an Internet browser software application on a user computing device is obtaining a video feed from a video provider 180, 182 or a live feed provider 190, 192, and displaying the video feed to the user, the web browser software application many send all or sampled frames of the video feed to the video information obtaining unit 138 at the same time the frames of the video feed are displayed to the user, or immediately thereafter.

Alternatively, the video information obtaining unit 138 could obtain all or a portion of a video feed being displayed to a user from the source—meaning from a video provider 180, 182 or a live feed provider 190, 192. In some cases, however, a user may be obtaining the video feed via a subscription service. In that instance, it may be impossible for the video information obtaining unit 138 to independently access the video feed from the source. As a result, it may be necessary for the video information obtaining unit 138 to obtain information about the video feed from the user computing device.

In some instances, the information obtained by the video information obtaining unit 138 may include information beyond the video data itself. For example, when there is information present in a previously generated recording, perhaps as a separate data track in the video recording, such information also may be captured by the video information obtaining unit 138 and provided to the action analysis unit 140. Similarly, if some kind of video or action information is provided in conjunction with a live video feed, such as a title or a general description of the content or type of the live video feed, that information also may be captured by the video information obtaining unit 138 and provided to the action analysis unit 140.

The action analysis unit 140 analyzes the information captured by the action information obtaining unit 138 and uses this information to generate an action model for the video feed. The data contained in the generated action model can be recorded in any of multiple different ways. The data could resemble a waveform, such as a sinusoidal waveform having an amplitude that varies over time. In other instances, the data could be recoded as a histogram. The data could be time series data. In other instances, the data could be recorded in a vector or vector array format. For example, each element in a vector array could correspond to a frame of video data, and the value(s) an the element of the vector array could contain information about one or more actors' positions as well as additional information. Virtually any conventional or nonconventional data recording technique could be used to generate the action model. Regardless of the format, the data in the action model will be indicative of the action occurring in the video feed being analyzed.

As depicted in FIG. 2, the action analysis unit could include an artificial intelligence or a machine learning unit 142 that helps to generate an action model for a video feed. The artificial intelligence or a machine learning unit 142 could be trained with data from a large number of previously recorded videos or with data from live video feeds. Once the artificial intelligence or a machine learning unit 142 has been trained, when the action information obtaining unit 138 supplies information about a new video feed the artificial intelligence or a machine learning unit 142 would use the newly provided information in conjunction with the previously applied training to help generate an action model for the new video feed.

The action analysis unit 140 may include a participant identifier 144 that is specifically configured to help identify the participants in a video feed. This could include the number of participants and possibly the gender of the participants. The participant identifier 144 might also be configured to determine which participants are interacting with one another. The participant identifier could determine when a new participant joins a video feed and when an existing participant leaves the video feed.

Identifying individual participants in a video feed can be important if a user is provided with the option or ability to tie activation of an electronic device to the actions associated with an individual participant in the video feed. For example, a user may indicate that they wish for an electronic device to be actuated synchronously with the actions of a specific participant in the video feed. Similarly, the user could indicate that a first electronic device is to be actuated synchronously with the actions of a first participant in the video feed and that a second electronic device is to be actuated synchronously with the actions of a second participant in the video feed.

The action analysis unit 140 may also include an action type identifier 146 that is configured to determine or classify the types of actions that are occurring in the video feed. In the case of adult entertainment, this could include identifying any of multiple different well-known types of sexual activity that routinely occur in adult entertainment films.

The action analysis unit 140 may further include a tempo identifier 148 that is configured to identify the speed or tempo of actions that are occurring in the video feed. As mentioned above, the action model for the video feed may be configured as a waveform that has an amplitude that varies over time. The tempo identifier 148 could be used to set and selectively vary the frequency of that waveform.

The action analysis unit 140 also includes a property scoring unit 149 that is responsible for analyzing the action occurring in a video feed and scoring the action based on one or more properties. This concept is discussed in more detail below in connection with FIGS. 7A-7C, 8A and 8B. Briefly, the property scoring unit 149 analyses the action or activity occurring in a video feed and assigns a score value for one or more properties of the action. A score for a particular property may be assigned to each frame of the video feed, for frames separated by a set number of other frames or for a group of frames. For example, the property scoring unit could analyze every $10^{th}$ frame of a video feed and assign a property score value for each tenth frame of the video feed.

The output of the property scoring unit 149 is a series of property scores for different points in time in the video feed. The property score values could be used to generate a property score signal representative of how a property of the action/activity occurring in the video feed varies over time. This sort of a property score signal can be used to generate an action model for the video feed.

In some embodiments, only a single property score signal may be generated for the video feed, and that single property score signal is used to help generate the action model. In other embodiments, multiple property score signals may be generated for the action/activity occurring in the video feed, and all the generated property score signals may be used to generate an action model for the video feed. In still other embodiments, one or more property score signals for a video feed may be used to generate a first type of action model for the video feed, whereas one or more other property score signals may be used to generate a second type of action model for the video feed.

Using the example of an adult entertainment video feed, the property scoring unit 149 might generate a first set of property score values that are intended to represent the amount of pleasure that a male participant in the video feed is experiencing over time, and those first set of property score values could be used to generate a male participant pleasure signal for the video feed. The property scoring unit 149 could also generate a second set of property score values that are intended to represent the amount of pleasure that a female participant in the video feed is experiencing over time. The second set of property score values could be used to generate a female participant pleasure signal for the video feed.

The male and female pleasure signals could be used together to generate an action model for the video feed. Alternatively, the male pleasure signal could be used to generate a first male action model for the video feed and the female pleasure signal could be used to generate a female action model for the video feed.

Scoring the action/activity of an adult entertainment video is but one example of a property score that the property scoring unit 149 might generate by analyzing a video feed. In other contexts, a video feed could be analyzed for various other properties.

For example, the property scoring unit 149 could analyze video feeds from various different locations within a public gathering place such as a sports stadium. In this instance, the property scoring unit 149 could be configured to generate property scores representative of crowd disturbances. An analysis of the video feed performed by the property scoring unit 149 could include an analysis of how people are physically moving as well as the words that are being spoken and the volume at which individuals are speaking. If an analysis of one of the video feeds indicates that the individuals present are acting peacefully, the property scores generated by the property scoring unit 149 would be low. If an analysis of a video feed indicates that the individuals are acting in a threatening or disturbing manner, then the property scoring unit 149 could return high value property scores. The property score values generated by the property scoring unit 149 could then be used to predict that a disturbance is about to erupt at a particular location at the sports stadium, allowing security personnel to be deployed before the disturbance occurs or as quickly as possible thereafter.

The property score values generated by the property scoring unit 149 could entirely generated by a software module that analyzes frames of image data from the video feed. This can include analyzing multiple frames of image data together to determine how the action or activity in the video feed is proceeding.

In some embodiments, the property score values could be scored with respect to a predetermined reference frame. For example, a certain property could be scaled by property score values from one to ten. The actual property score value for an image frame or a group of image frames would then have a value between one and ten.

In other embodiments, a set of observations or measurements with respect to one or more types of action occurring in the video feed could be used to calculate a property score value. Here, values with respect to multiple aspects of the action/activity could be combined according to an algorithm or formula to calculate the property score value for a frame of group of frames of the video feed.

In still other embodiments, a human could be involved in determining property score values for video feed. In this instance, a human could be observing the video feed and constantly or periodically assigning property score values. Those human-assigned property score values would be collected and reported by the property scoring unit 149.

In some embodiments, artificial intelligence and/or machine learning could be employed by the property scoring unit 149 to generate property score values for video feeds. For example, one or more human operators could assign property scores for a particular property while reviewing multiple video feeds for the same general type of video feed. This information could be used as input to a machine learning process that is designed to determine how to generate property score values for that particular type of video feed. With this as input, the property scoring unit 149 may thereafter assign property score values for video feeds based on how the human operators were scoring similar types of video feeds.

More details on the how the property scoring unit 149 generates property score values is provided below in conjunction with FIGS. 7A-7C, 8A and 8B.

The action analysis unit 140 may further include a sentiment analysis unit 150 that is configured to identify sentiments, emotions or tone of a video feed. As is known to those skilled in the art, a sentiment analysis unit 150 can take various items of information into account when attempting to identify sentiments, such as the volume of voices and the words which participants in the video feed are using.

The information developed by elements of the action analysis unit 140 are then fed to an action model generator 152 that generates an action model for a video feed. Regardless of whether the video feed is a live video feed or a video feed of a recording, as analysis of the video feed progresses, and more information if developed by the elements of the action analysis unit, the action model for the video feed can be continuously updated and refined. Once analysis of the video feed is complete, the action model generator 152 will generate a final action model for the video feed, and that final action model may be stored in the action model database 134.

As noted above, the action model generator 152 could generate multiple action models for the same video feed. Each separate action model for the video feed could be representative of a different property or characteristic of the action/activity occurring in the video feed.

The action model for a video feed may resemble a property score signal, with a signal value that increases and decreases over time to represent changes in the action in the video feed. This type of information in the action model is used to generate a device drive signal, as discussed in more detail below.

Once a final action model has been generated and stored in the action model database 134, the action model may be subject to updates and refinements. For example, if one or more elements of the action analysis unit 140 are updated or improved, or if a new element is added to the action analysis unit 140, a previously stored action model may be updated using the new/updated action analysis unit. This could include a complete new review of the original video feed by the new/updated action analysis unit 140, or only selected updates of the action model based on a selected review of only portions of the original video feed.

As mentioned above, the electronic device control system 130 predicts future actions that are likely to occur in a video feed based on the action model for the video feed and based on actions that just occurred in the video feed. The recent action obtaining unit 154 is responsible for obtaining information about actions that just occurred in the video feed. To accomplish this, the recent action obtaining unit 154 may also obtain all or portions of the video feed from a user computing device that is displaying the video feed, or perhaps from the source—meaning a video provider 180, 182 or a live feed provider 190,192. This could include obtaining a copy of the video feed data for the last few seconds or last few minutes of the video feed, or samples of frames of image data from the last few seconds or minutes of the video feed.

The recent action obtaining unit 154 also must then analyze the last few seconds of the video feed data to determine the actions that recently occurred in the video feed. As a result, the recent action obtaining unit 154 will includes some elements that are similar to the elements present in the action analysis unit 140 of the action model generation unit 136. Because the recent action obtaining unit 154 is only responsible for determining the actions that recently occurred, the analyzing capabilities of the recent action obtaining unit 154 need not include all the analyzing capabilities as the action analysis unit 140. Thus, the recent action obtaining unit 154 may only include items like the action type identifier 146 and the tempo identifier 148 of the action analysis unit 140. Ultimately, the recent action obtaining unit 154 is only responsible for providing a general indication of the actions that just occurred in the video feed. This information is then provided to the action prediction unit 156.

The action prediction unit 156 uses an action model for the video feed and information about recent actions that occurred in the video feed as reported by the recent action obtaining unit 154 to generate a prediction of the actions that are about to occur in the video feed. As explained above, the action model could be one that was previously generated for the video feed, and which has been stored in the action model database 134. Obtaining a previously generated action model would be common where the video feed is for a previously recorded video. Alternatively, the action model may be one that is currently being developed for the video feed by the action model generation unit 136. This would usually be the case where the video feed is a live feed. This means that when a live feed is being displayed to a suer, the action prediction unit 156 has access to the action model that is currently being developed for the live video feed by the action model generation unit 136.

The action prediction unit 156 then sends information about predicted future actions to a drive signal generator 158 that is responsible for generating one or more drive signals that are used to actuate one or more electronic devices synchronously with action in the video feed. The drive signal that is generated is configured to actuate an electronic device so that the device is actuated synchronously with the actions that are predicted to soon occur in the video feed.

A drive signal could be a waveform with an amplitude that varies over time. A drive signal could also include various control signals that are used to selectively vary settings of an electronic device. The configuration of the drive signals that are generated by the device drive signal generator 158 will depend, in part, on the configuration of the electronic devices being actuated by those drive signals. Different electronic devices will require different types of drive signals.

For example, if a first electronic device includes only a single actuator, the drive signal that is generated for that first electronic device may include only a single track or channel of information that varies over time. A second electronic device that includes three actuators, such as three vibrating actuators, may require a drive signal having three tracks or channels of information, one for each of the three actuators. Of course, the drive signal that is generated and sent to an electronic device may include additional tracks or channels of information that provide control or setting information, that provide ancillary information, or that control aspects of an electronic device's operation that are not directly tied to an actuator.

The electronic devices that are being driven can take any of nearly an endless variety of configurations. An electronic device could include a vibration generator, an electric motor, and/devices designed to generate flows of air, gasses or liquids. Heating and/or cooling devices could be included in an electronic device. Any one electronic device could have only a single electronically actuated actuator or mechanism, or multiple combinations of actuators and mechanisms. Because of the many different ways that an electronic device can be configured, the device drive signals that are generated for a particular electronic necessarily device flow from the configuration of the electronic device itself.

The device drive signal generator 158 may include a device/user signal obtaining unit 160 that obtains a device signal containing various items of information that is sent from an electronic device that is being actuated. As explained below, the device signal may be acquired by a software application running on the user's computing device and the software application may forward that device signal to the device/user signal obtaining unit 160. Alternatively, a device/user signal receiver 172, as discussed below, may acquire a device signal. Such a device signal may include information about the current configuration and settings of the electronic device, information about the user of the electronic device, and possibly information acquired by one or more sensors of the electronic device. When available, information in a device signal as acquired by the device/user signal obtaining unit 160 could be taken into account in generating a device drive signal that is then used to actuate the electronic device.

The device/user signal obtaining unit 160 may also obtain a user signal that includes information provided or specified by a user. As explained below, the user signal may be acquired by a software application running on the user's computing device and the software application may forward that user signal to the device/user signal obtaining unit 160. Alternatively, a device/user signal receiver 172, as discussed below, may acquire a user signal. The user signal can include various items of information describing the user or the user's characteristics. The user signal can also include information about user preferences. The user signal could further include information about user selections that determine how an electronic device drive signal is generated or configured. For example, the user may be given the option to actuate a specific electronic device synchronously with the actions of a particular participant shown in a video feed. Information about the user's selection of a specific participant could be included in the user signal received by the device/user signal obtaining unit 160. Information in an obtained user signal is then taken into account in generating a device drive signal that is then used to actuate the electronic device.

The device drive signal generator 158 may include multiple different drive signal generators, one for each of multiple different types of electronic devices. The embodiment illustrated in FIG. 2 includes a first device type drive signal generator 162, a second device type drive signal generator 164 and a third device type drive signal generator 166. Each of the drive signal generators 162, 164, 166 generate different types of drive signals for different types of electronic devices.

For example, FIG. 1 illustrates that a second user computing device 114 is coupled to a second electronic device 116 and a third electronic device 118. The second electronic device may be configured to sexually stimulate a male and the third electronic device may be configured to sexually stimulate a female. The second device type drive signal generator 164 may generate a drive signal that actuates the second electronic device based on actions occurring in the video feed, and the third device type drive signal generator 166 may generate a drive signal to actuate the third electronic device 118 based on actions occurring in the video feed. The drives signals would be different to take into account both the different nature of the electronic devices, and possibly also the different actions that are occurring in the video feed for a male participant and for a female participant in the video feed.

The device drive signal generators 162, 164, 166 generate drive signals based, in part, on the action model that has been acquired or generated for video feed being displayed and based on the output of the action prediction unit. As explained above, the action model may include one or more signals that each have a value that varies over time. One or more of those signals can be used to generate a device drive signal. For example, if the action model for an adult entertainment video feed includes a signal that indicates that the action in the video feed represents increasing amounts of pleasure for a participant in the video feed, the device drive signal that is generated based on the action model could gradually increase the speed or drive action of an electronic device to synchronize increased actuation of the electronic device with increased pleasure experienced by the participant in the video feed. In this way, the device drive signals generated by the device drive signal generators 162, 164, 166 synchronize actuation of one or more electronic devices to the action in the displayed video feed.

The electronic device drive signals generated by the device drive signal generator 158 are then communicated to one or more electronic devices by a drive signal transceiver 168. The drive signal transceiver includes a drive signal transmitter 170 that sends one or more electronic device drive signals to electronic devices. In some embodiments, the drive signal transmitter 170 may send a device drive signal to a software application on a user computing device 110, 114, 120, and the user computing device then delivers the drive signal to one or more electronic devices. In other instances, the drive signal transmitter 170 may send one or more drive signals directly to electronic devices via the Internet 102. In other words, an electronic device may be in communication with the drive signal transmitter 170 over the Internet 102, in which case a drive signal could be directly sent to the electronic device via the Internet 102

In some instances, a drive signal may be generated by the device drive signal generator 158 for a particular first type of electronic device based on a live video feed. That drive signal may then be sent to multiple versions of the first type of electronic device that are being used by multiple individuals, all of whom are watching the same live video feed. This results in a plurality of electronic devices being actuated substantially simultaneously based on the same live video feed.

A device/user signal receiver 172 may obtain a device signal, as discussed above, directly from an electronic device over the Internet 102, or from a software application running on a user computing device. The device/user signal receiver 172 may also obtain a user signal that includes information provided by or specified by a user. The device/user signal receiver 172 may then provide the device and/or user signal to the device drive signal generator 158, which takes the device and/or user signal into account when generating a drive signal for the electronic device.

A synchronization unit 174 of the device signal transceiver 168 may help to coordinate delivery of a drive signal to an electronic device to help synchronize actuation of an electronic device with the actions occurring in the video feed. For example, the synchronization unit 174 may be capable of determining the time delay which presently occurs as a drive signal is transmitted to and applied to an electronic device. Based on that information, the synchronization unit 174 may deliberately delay transmission of the drive signal to the electronic device so that when the drive signal arrives at the electronic device, the drive signal will cause the electronic device to be actuated synchronously with the action occurring in the video feed.

Alternatively, or in addition, the synchronization unit 174 may send synchronization information to a synchronization unit 314 of a software application 300 (discussed below) that is in communication with the electronic device and which is responsible for delivering the drive signal to the electronic device. The synchronization information is then used by the synchronization unit 314 of the software application 300 to help synchronize actuation of the electronic device with action occurring in the video feed. In instances where an electronic device is receiving a drive signal directly from the drive signal transmitter 170 via the Internet, synchronization information sent to the synchronization unit 314 of the software application 300 may still be useful in helping to synchronize actuation of the electronic device with display of the video feed.

In the example given above where multiple electronic devices are all being substantially simultaneously actuated based on the same live video feed, there may be variable delays associated with delivery of the drive signal to each of the multiple electronic devices. The synchronization unit 174 can compensate for the variable drive signal delivery delays such that all the electronic devices are actuated synchronously with the live video feed.

Another approach is to have different action models for the same video feed, where each action model contemplates a different time delay in transmitting a device drive signal to the electronic device. In this scenario, the synchronization unit 174 may be responsible for determining the time delay in transmitting a device drive signal to an electronic device. Once the time delay is known, the appropriate action model for that amount of time delay is used to generate and send the device drive signals.

Figure 3:
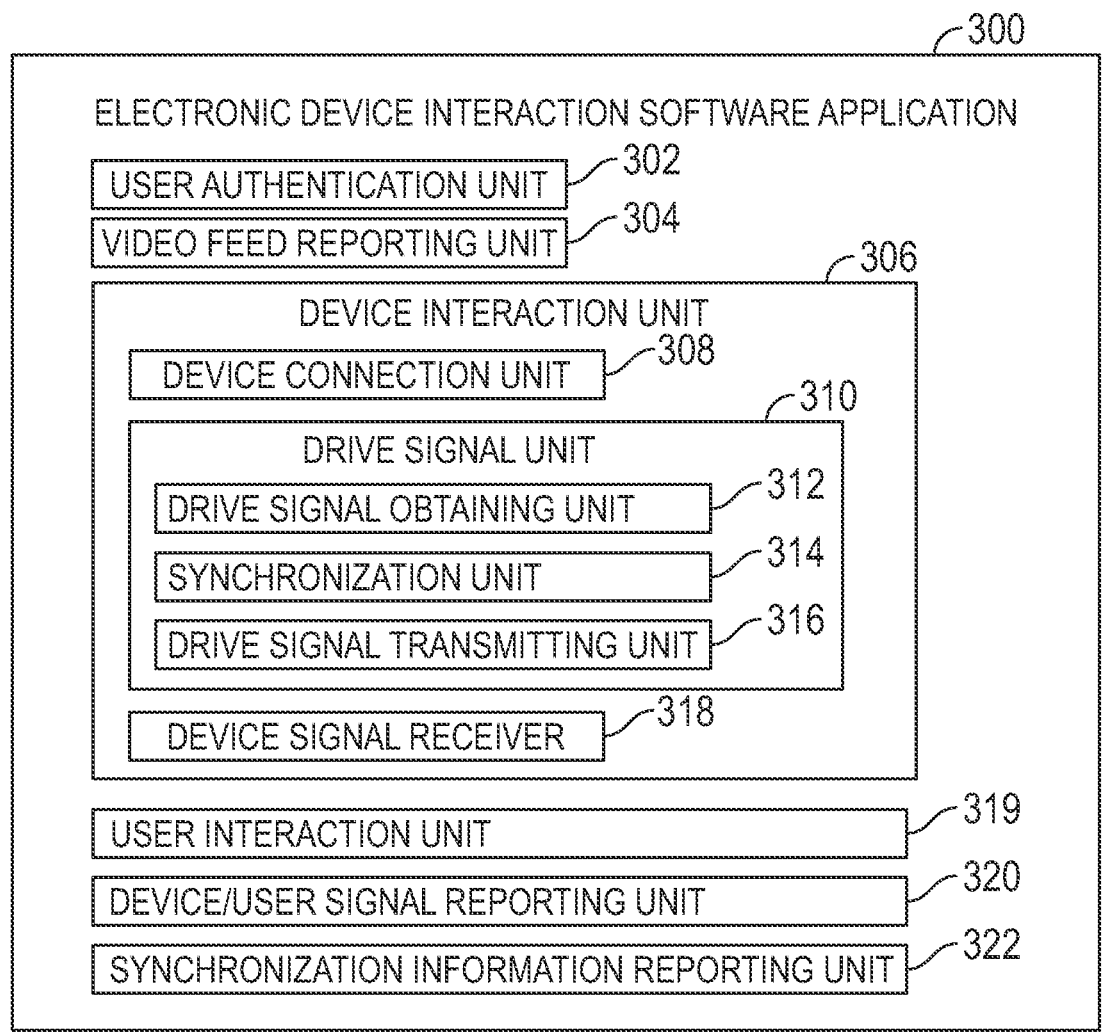
FIG. 3 is a diagram of selected elements of a software application that can be used to control an electronic device.

FIG. 3 illustrates selected elements of an electronic device interaction software application 300 that may be running on a user's computing device and which is used to interact with and actuate an electronic device synchronously with a video feed being displayed to a user. The electronic device interaction software application 300 may itself be responsible for also displaying the video feed. Alternatively, the video feed may be displayed to the user via a separate software application, such as an Internet browser, a video player software application or some other software application.

In some instances, the electronic device interaction software application 300 may be a stand-alone software application running on a user computing device. In other instances, the electronic device interaction software application may be configured as a plug-in to an Internet browser software application.

The electronic device interaction software application 300 is designed to allow a user to cause an electronic device to be actuated synchronously with the display of a video feed. As such, the software application 300 is designed to link to an electronic device via a wired or wireless connection, and in some cases to deliver the drive signal to the electronic device.

The applicant presently contemplates that providing device actuation signals to one or more electronic devices in order to actuate the electronic devices synchronously with a displayed video feed may be a subscription service. For that reason, the software application 300 includes a user authentication unit 302 that allows a user to sign in to a previously established user account in order to obtain services that include obtaining and using drive signals to drive one or more electronic device synchronously with a displayed video feed. The user authentication unit 302 may also allow a new user to setup a user account, add or change payment options, add or change service options, etc. The user authentication unit 302 would make use of well-known techniques for all these purposes.

The service that generates and provides electronic device drive signals may maintain information about the user, such as user characteristics, the user's preferences and the user's viewing or usage habits. This information can be stored in a database of user information. When the user signs in with a previously established user account, the information about the user and the user's preferences and habits may be provided to the device drive signal generator 158 of an electronic device control system 130 so that this information can be taken into account when generating device drive signals.

Information about a user's viewing habits could include whether the user tends to fast-forward through the initial portions of a video, when the user tends to watch certain segments of videos repeatedly, and various other items of information about the user's typical viewing habits.

The software application includes a video feed reporting unit 304 that reports information to an electronic device control system 130 about one or more video feeds that are being displayed to a user or that are setup to soon be displayed to a user. The electronic device software application 300 may obtain information about the video feed being displayed to the user from a separate software application that is also running on the user's computing device and which is responsible for displaying the video feed to the user. The information about the video feed could include actual video data, meaning actual frames of image data from the video feed. For example, the video feed reporting unit 304 could send actual frames of image data to the video information obtaining unit 138 and/or the recent action obtaining unit 154 of an electronic device control system 130 to enable the electronic device control system 130 to generate electronic device drive signals, as explained above.

Alternatively, or in addition, the video feed reporting unit 304 could send information about the video feed being displayed to the user, and possibly information about the source of the video feed, to elements of the electronic device control system 130 so that elements of the electronic device control system can independently obtain information about the video feed, possibly from the source of the video feed. Here again, such information sent by the video feed reporting unit 304 to the electronic device control system 130 is intended to enable the electronic device control system 130 to generate drive signals for driving one or more electronic devices synchronously with action on the displayed video feed.

The electronic device interaction software application 300 also includes a device interaction unit 306 that is configured to communicate with and/or control one or more electronic devices. A device connection unit 310 establishes a communications channel with an electronic device using a wired or wireless communications capability of the user computer upon which the software application 300 is running. This could include establishing a Bluetooth or WiFi connection with the electronic device. The device connection unit 308 may be capable of establishing, maintaining and using multiple simultaneous communications channels to communicate with and control a corresponding plurality of electronic devices. As part of the process of establishing a communications channel with an electronic device, information about the electronic device, such as a device type or device settings may be acquired by the device connection unit 308. Further, authorization information such as passwords or credential information may be required to establish a communications channel with the electronic device.

A drive signal unit 310 is responsible for obtaining and applying a drive signal to an electronic device to acuate the electronic device synchronously with the display of a video feed. To that end, the drive signal unit 310 includes a drive signal obtaining unit 312 that obtains a drive signal for an electronic device from a drive signal transmitter 170 of an electronic device control system 130. The drive signal so obtained may be for the particular type of electronic device being driven, and that drive signal may be customized in some way for device settings of the electronic device and/or user preferences of the user.

A synchronization unit 314 could send timing information to a synchronization unit 174 of a drive signal transceiver 168 of an electronic device control system 130, and/or the synchronization unit 314 of the software application 300 could receive synchronization information from a synchronization unit 174 of the drive signal transceiver 168, The exchange of this type of synchronization information us used to help actuate the electronic device in synchronization with action on the displayed video feed. For example, the synchronization unit 314 could receive a synchronization signal from the synchronization unit 174 of the drive signal transceiver 168 and use that signal to selectively delay application of the electronic device drive signal to the electronic device to help actuate the electronic device synchronously with the display of the video feed. If the electronic device is receiving a drive signal via the Internet 102 directly from the drive signal transceiver 168 of a electronic device control system 130, the synchronization unit 314 of the software application 300 may nevertheless provide information to the electronic device that the electronic device can itself use to help synchronize actuation with the action in the video feed.

A drive signal transmitting unit 316 communicates a drive signal acquired by the drive signal obtaining unit 312 to the electronic device. As discussed, information acquired by the synchronization unit 314 may also be used to determine how and when the drive signal transmitting unit 316 sends the drive signal to the electronic device.

The device interaction unit 306 may further include a device signal receiver 318 that receives information from an electronic device. As discussed above, received device information could include information about the type, model, configuration and settings of the electronic device. Such information may also include data reported from one or more sensors of the electronic device, which can include sensed information relating to the user.

A device/user signal reporting unit 320 reports information about the device, information about the user and/or information specified by or provided by a user to elements of an electronic device control system 130. This can include information obtained by the device signal receiver 318, information obtained by the device connection unit 308 when establishing a communications channel with an electronic device, and information obtained via a user interaction unit 319, as discussed below. This information could also include information about the user, the user's preferences and the user's viewing habits that are obtained from a database of user information. Such information can be reported to the device/user signal obtaining unit 160 to help the device drive signal generator 158 create an appropriate drive signal for an electronic device. Such information might also be communicated to the device/user signal receiver 172 of the device signal transceiver 168.

A user interaction unit 319 interacts with a user to obtain various items of information relevant to the user. The information specified by or provided by the user could include information about the user's characteristics and preferences. The user interaction unit 319 may also allow a user to specify that a specific electronic device is to be actuated synchronously with the actions of a specific participant in a video feed. Thus, the user interaction unit 319 may provide the user with the ability to select a specific participant appearing in a video feed as the one to which actuation of an electronic device is to be synchronized.

Information obtained from the user via the user interaction unit 319 is then reported by the device signal reporting unit 320 to the device/user signal receiver 172 or the device/user signal obtaining unit 160 of an electronic device control system 130.

If the system is being used in connection with electronic devices used to sexually stimulate an individual, the user preferences could include things like how the user prefers particular types of electronic devices to be actuated, how electronic devices should be actuated when no video feed is being displayed or between display of video feeds. The user may also be able to specify how an electronic device is to be actuated in connection with specific types of video feeds or in connection with specific types of actions occurring in video feeds.

The user interaction unit 319 may also be configured to interact with one or more sensors that detect one or more aspects of a user's present physical condition. This could include a user's heart rate, temperature, state of arousal, moisture content, blood pressure, etc.

In some embodiments, the software application 300 may further include a synchronization information reporting unit 322 that reports synchronization information to a synchronization unit 174 of the device signal transceiver 168 of an electronic device control system 130. This could include a scenario where the synchronization unit 174 of the electronic device control system 130 sends a periodic synchronization signal to the synchronization information reporting unit 322 of the software application, and the synchronization information reporting unit sends a response signal back to the synchronization unit 174 of the electronic device control system 130. This would allow the drive signal transceiver to determine an approximate amount of time required for a drive signal sent from the drive signal transceiver 168 to arrive at the drive signal obtaining unit 312 of the software application. Here again, such synchronization information is used to help actuate an electronic device synchronously with display of a video feed.

Figure 4:
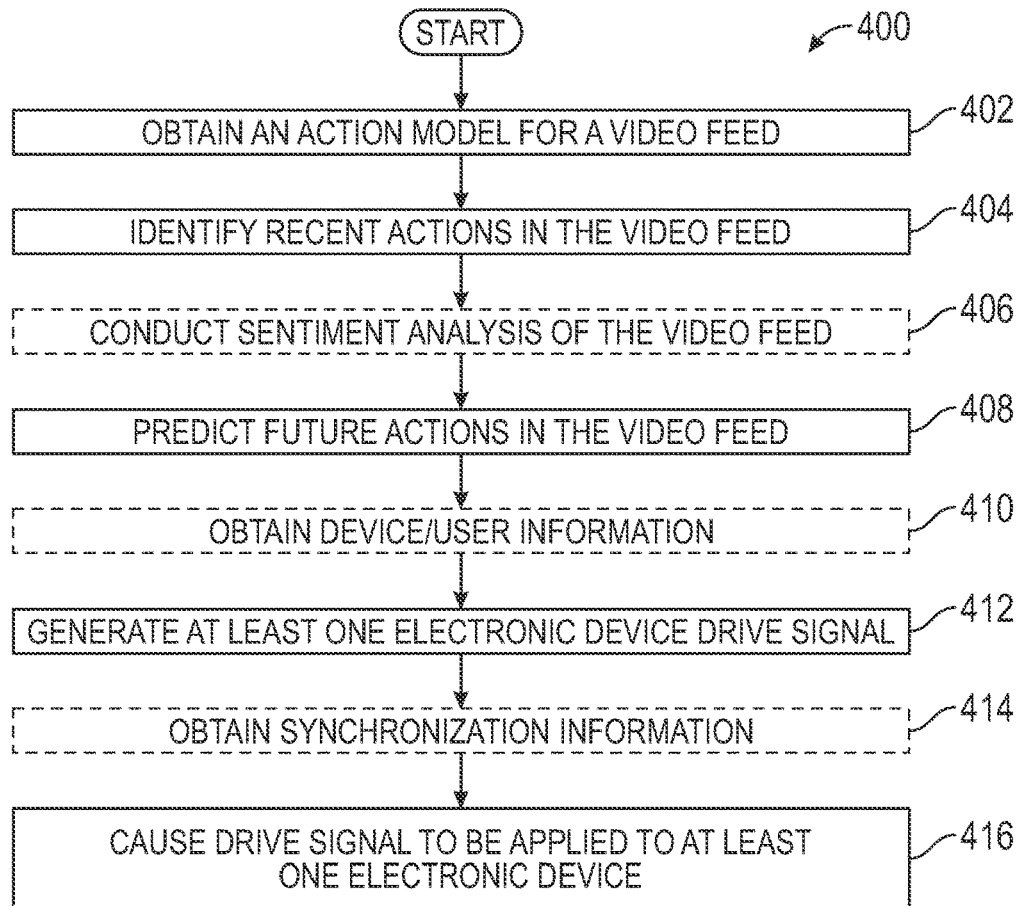
FIG. 4 is a flowchart illustrating steps of a method of generating an electronic device drive signal based on action in a video feed and of causing the drive signal to be applied to one or more electronic devices.

FIG. 4 depicts steps of a method 400 for generating and applying drive signal to an electronic device to actuate the electronic device in synchronization with display of a video feed. The method would be performed by elements of an electronic device control system 130 as depicted in FIG. 2, and possibly with the assistance of elements of an electronic device interaction software application 300 as depicted in FIG. 3.

The method 400 begins and proceeds to step 402, wherein an action model unit 132 obtains an action model for a video feed that is being or will be displayed to a user via a user computing device. If an action model for the video feed has previously been generated, step 402 could involve obtaining an action model from the video feed from an action model database 134. If no action model exists for the video feed, which likely would be the case for a live video feed, step 402 could involve an action model generation unit 136 generating an action model for the video feed. The process of generating an action model for a video feed will be discussed separately below in connection with the method depicted in FIG. 5.

The method 400 then proceeds to step 404 where a recent action obtaining unit 154 obtains information about actions that recently occurred in the video feed. As explained above, this can include obtaining information about portions of the video feed that were recently displayed to the user and analyzing such obtained information to identify the actions that recently occurred in the video feed.

Step 406 is an optional step that may or may not be performed. In step 406, a sentiment analyzer 150 may conduct a sentiment analysis on portions of the video feed which have already been displayed. Next, in step 408, an action prediction unit 156 uses the obtained action model for the video feed and information about recent actions occurring in the video feed as identified by the recent action obtaining unit 154 to generate a prediction about future actions that are likely to occur in the video feed. If optional step 406 is performed, information developed by the sentiment analyzer 150 may also be taken into account by the action prediction unit 156 to predict the actions that will occur next in the video feed.

The method then proceeds to step 410, which also is an optional step. In step 410, information about the electronic device to be driven by the drive signal may obtained via a device/user signal obtaining unit 160 and/or a device/user signal receiver 172. This step may also comprise obtaining information provided by or specified by a user, such as user characteristics and preferences. The obtained user information could include other information specified by a user, such as the user specifying that a specific electronic device is to be actuated synchronously with the actions of a specific participant in a video feed. The method then proceeds to step 412, where one or more device drive signal generators 162, 164, 166 generate at least one drive signal for an electronic device using at least the predicted future action as identified by the action prediction unit 156. If device information is obtained in optional step 410, such device information may also be taken into consideration in developing one or more electronic device drive signals.

Step 412 may involve only generating a single drive signal for a single specific electronic device. Alternatively, step 412 may involve generating multiple electronic device drive signals, one for each of multiple different types of electronic devices. Step 412 also may involve generating multiple electronic device drive signals, where each individual device drive signal is customed for a specific electronic device based on the device type and possibly device information received by the device/user signal obtaining unit 160.

The method then proceeds to step 414, which also is an optional step. In step 414 synchronization information is obtained by a synchronization unit 174, as discussed in detail above.

Finally, the method proceeds to step 416 where any generated drive signal(s) is/are applied to one or more electronic devices. This could involve a drive signal transmitter 170 communicating a drive signal directly to an electronic device via the Internet 102. Alternatively, this could involve the drive signal transmitter 170 sending one or more drive signals to a drive signal obtaining unit 312 of a software application running on a user computing device, and a drive signal transmitting unit 316 of the software application 300 communicating that drive signal to a connected electronic device. When available, synchronization information obtained in optional step 414 may be used to communication the device drive signals to electronic device to help actuate the electronic devices synchronously with display of a video feed. The method then ends.

The method illustrated in FIG. 4 and discussed above could be performed by elements of an independent electronic device control system 130 that is running on one or more remote servers. In that instance, the electronic device drive signal(s) generated in the method would be communicated in some fashion over a data network such as the Internet to the electronic devices that are actuated by the drive signal(s).

In alternate embodiments, however, the electronic device control system 130 may be a part of a software application that is running on a user computing device. In that case the electronic device interaction software application 300 depicted in FIG. 3 may be incorporated into and be a part of a single software application that acts as both the electronic device control system 130 and the electronic device interaction software application 300, and which both generates and applies drive signals to one or more connected electronic devices. Alternatively, the electronic device control system 130 may be embodied as a first software application running on a user computing system, and the electronic device interaction software application 300 may be a separate software application that also is running on the same user computing device. Either way, the drive signals generated by a method as depicted in FIG. 4 would then be applied to one or more electronic devices that are connected to the user computing device via a wired or wireless communication channel.

Figure 5:
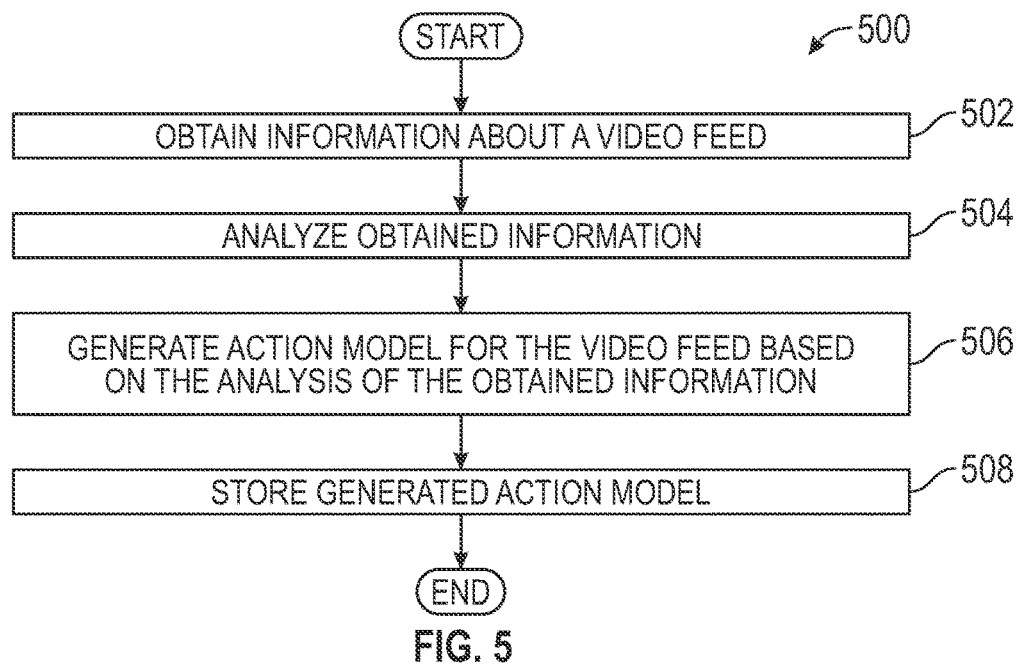
FIG. 5 is a flowchart illustrating steps of a method of generating an action model for a video feed that could be used to help generate an electronic device drive signal.

FIG. 5 depicts a method of generating an action model for a video feed, which could be what occurs in step 402 of the method depicted in FIG. 4. Here again, the method would be performed by elements of an electronic device control system 130, and more specifically, elements of an action model unit 132 of an electronic device control system 130.

The method 500 begins and proceeds to step 502 where information about a video feed is obtained by a video information obtaining unit 138. As explained above, this could involve the video information obtaining unit obtaining all or selected portions of a video feed from a user computing device that is displaying the video feed, or possibly from a source of the video feed.

In step 504, an action analysis unit 140 analyzed the video information obtained by the video information obtaining unit 138. This could include performing multiple different types of analysis using the various elements of the video analysis unit 140 as described above.

In step 506, an action model generator 152 generates an action model for the video feed based on the analysis performed by the action analysis unit 140. As explained above, the way in which the action model is formatted and the way the data contained in the action model is generated could vary. However, the information in the action model reflects the actions occurring in the video feed.

In step 508, the action model generated in step 506 is stored in an action model database 134. The method 500 then ends.

Figure 6:
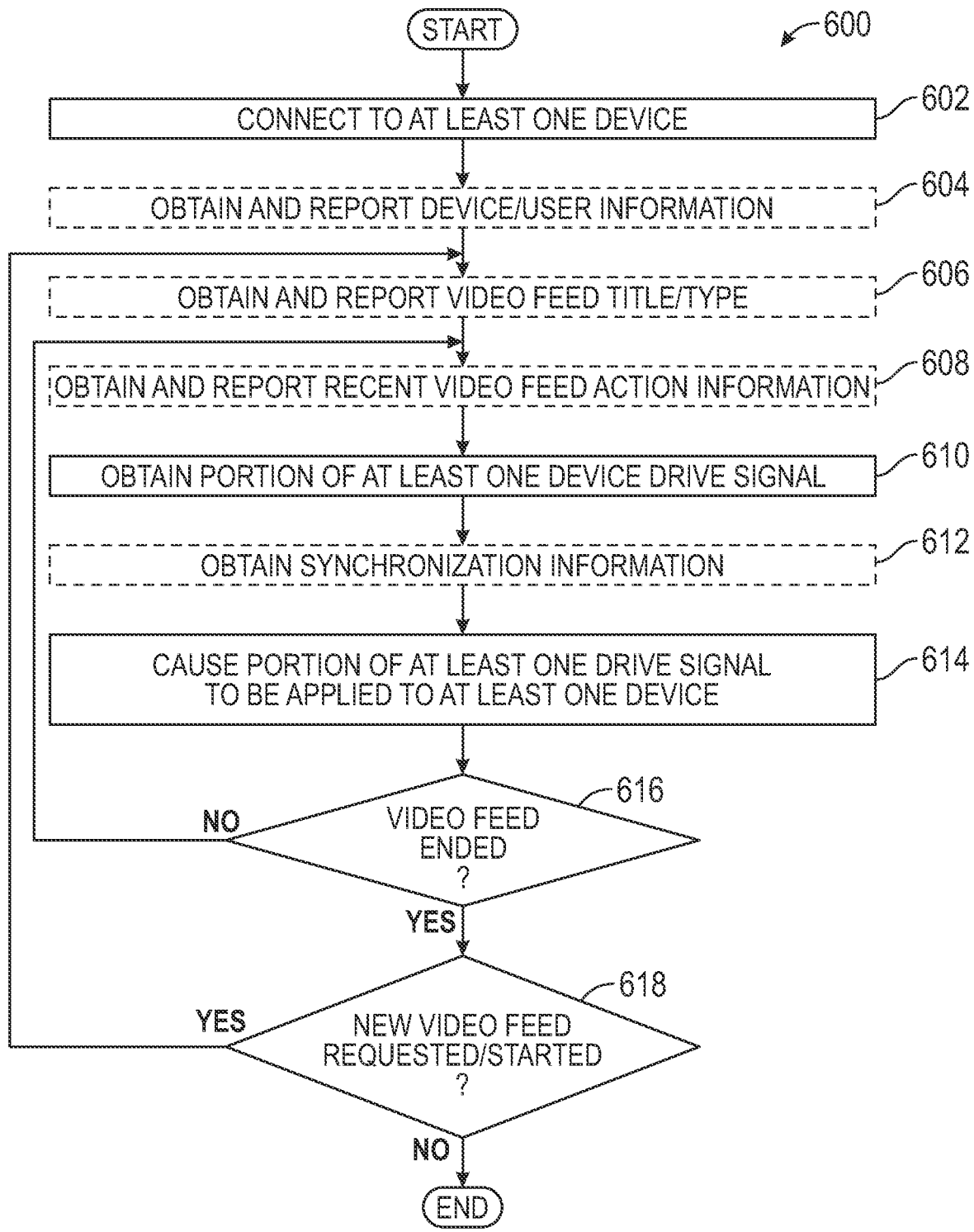
FIG. 6 is a flowchart illustrating steps of method performed by a software application for driving an electronic device based on an obtained drive signal.

FIG. 6 depicts a method what would be formed by an electronic device interaction software application 300 running on a user computing device. The method involves establishing a communications channel with an electronic device and then obtaining and applying a drive signal to the electronic device.

The method 600 begins and proceeds to step 602 where a device connection unit 308 establishes a communications channel with one or more electronic devices. As discussed above, this could include establishing a wired or wireless connection with the electronic device. As also discussed above, credentials may be required to establish the connection.

Steps 604 and 606 are optional steps that may or may not be performed. In optional step 604 a device/user signal receiver 172 and/or a device/user signal obtaining unit 160 obtains device information from a connected electronic device, or user information provided by or specified by a user. As discussed, this can include device type, model and settings information, as well as information reported from sensors of the electronic device. This information could also include information about user characteristics or preferences. This could also include information about whether a specific electronic device is to be actuated synchronously with the actions of a specific participant in a video feed. When such information is obtained, it can be reported to a device/user signal obtaining unit 160 or a device/user signal receiver 172 of an electronic device control system 130 by a device/user signal reporting unit 320 of the software application 300.

In optional step 606 information about a video feed being displayed or about to be displayed to a user is obtained and reported to elements of the electronic device control system 130 by a video feed reporting unit 304 of the software application 300. Such information can include a title of the video feed and information about the video feed such as type of content information. Such information could be reported to a video information obtaining unit 138 and/or a recent action obtaining unit 154 of the electronic device control system 130.

Next, in step 608, information about recent actions in the video feed is reported to the recent action obtaining unit 154. This could include sending video feed data or selected frames of image data from the video feed to the recent action obtaining unit 154. Step 608 also is an optional step and would be performed when this type of recent action information is available to the software application 300. In alternate embodiments, a separate software application on the user computing device may be responsible for sending recent action information to the recent action obtaining unit 154.

As will be appreciated, the process of displaying a video feed involves constantly displaying new image and audio data to the user. The process of applying a drive signal to an electronic device to actuate the electronic device synchronously with the action in the video feed also is a continuous process. In reflection of these facts, step 610 involves the drive signal obtaining unit 312 obtaining a portion of a drive signal for an electronic device as the drive signal is being generated by the drive signal generator 158 of an electronic device control system 130. In an optional step 612, a corresponding portion of a synchronization signal also is obtained by the synchronization unit 314 from a synchronization unit 174 of the electronic device control system 130. The method then proceeds to step 614, wherein a drive signal transmitting unit 316 applies the obtained portion of the drive signal to a connected electronic device. The way in which the drive signal transmitting unit applies the drive signal to the electronic device may be modified based on synchronization information obtained in optional step 612.

The method then performs a check to determine if the video feed has ended. If so, the method end. If not, the method loops back to step 608, and steps 608-616 are repeatedly performed as a video feed is displayed to a user and as the electronic device is actuated based on the obtained drive signal.

When a check performed in step 616 indicates that a video feed has ended, the method proceeds to step 618 and a check is performed to determine if the user has requested to play of a new video feed. If not, the method may end. If so, the method loops back to step 606 and information about the newly requested video feed is obtained and reported in step 606. The method then proceeds as described above. When a check performed in step 618 indicates that the user is not requesting the display of a new video feed, the method ends.

The discussion of the method depicted in FIG. 6 provided above involved obtaining one electronic device drive signal and applying that drive signal to the electronic device. In alternate embodiments of a method as depicted in FIG. 6, the software application could establish communications channels with multiple electronic devices and obtain and apply separate drive signals to each of those multiple electronic devices.

FIG. 1 depicts an environment in which the electronic device control system 130 is illustrated as being separate from the user computing devices. However, in some embodiments the electronic device control system 130 depicted in FIG. 2 may be a part of a user computing device. For example, a software application residing on a user computing device could be configured as the electronic device control system 130. Indeed, the electronic device interaction software application 300 depicted in FIG. 3 and the electronic device control system 130 depicted in FIG. 2 could be part of a single software application that is running on a user computing device.

Figure 7A:
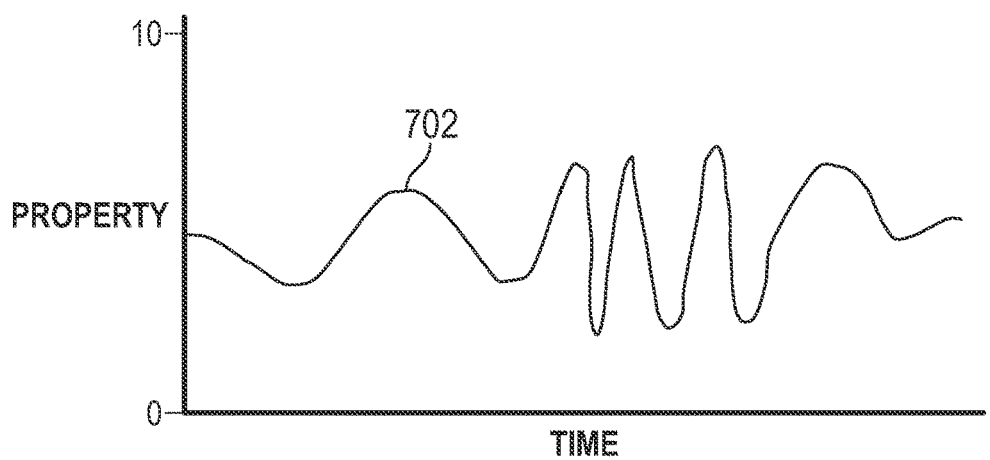
FIGS. 7A-7C illustrate various property signals that can be used to generate action models.
Figure 7B:
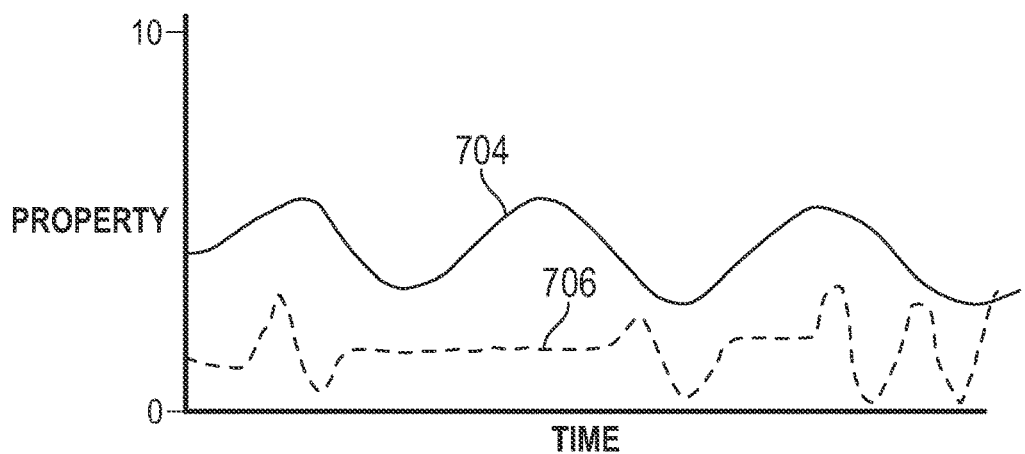
Figure 7C:
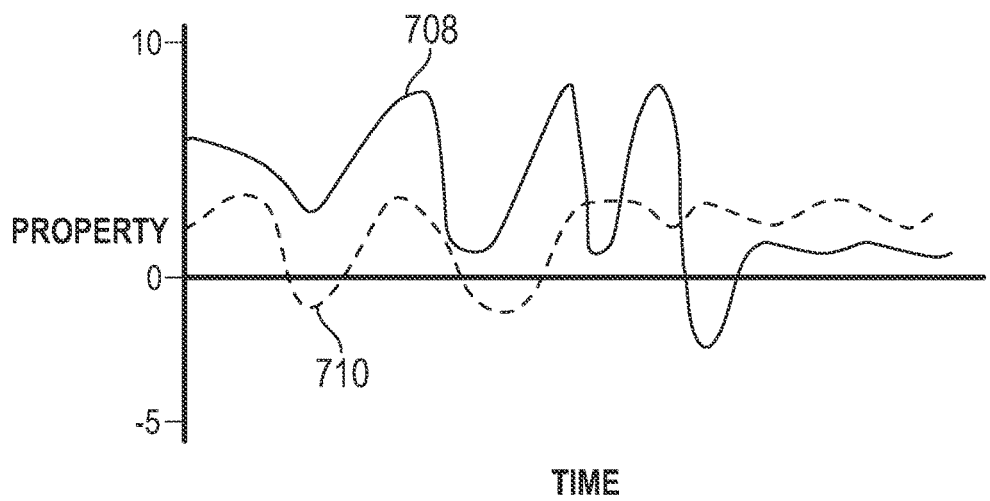

FIGS. 7A-7C illustrate property score signals that could be generated by a property scoring unit 149 of an action model generation unit 136. As explained above, such property score signals can be used by an action model generator 152 to generate one or more action models for a video feed.

FIG. 7A illustrates a single case where a single property score signal 702 is generated for a video feed. The property score signal 702 is based on multiple property score values generated by the property scoring unit for individual or groups of frames of image data from the video feed. For the property being measured, the value varies over time.

As illustrated in FIG. 7B, the property scoring unit 149 could be configured to generate two different property score signals 704 and 706 for the same video feed. The first property score signal 704 is indicative of a first property of the action/activity in the video feed. The second property score signal 706 is indicative of a second, different property of the action/activity in the video feed. The first and second property score values 704, 706 could be used to together by the action model generator 152 to generate an action model for the video feed. Alternatively, the action model generator 152 could generate a first action model for the video feed based on the first property score signal 704, and he action model generator could generate a second action model for the video feed based on the second property score signal 706. In still other instances, both the first and second property score signals 704 and 706 could be used together to generate a first action model for the video feed, while only one of the first and second property score signals 704, 706 is used to generate a second action model for the video feed.

In some embodiments, the property score values that give rise to the first and second property score signals 704, 706 could have values between 0 and 10. Alternatively, the property score values for a first property that are used to generate the first property score signal 704 could have values according to a first scale and the property score values for the second property that give rise to the second property score value signal 706 could have values according to a second different scale.

FIG. 7C illustrates the concept that one or more of the property score signals could include negative values. In the example illustrated in FIG. 7C, a first property score signal 708 created from the values of a first property of the action/activity in a video feed all have values between 0 and 10. However, the second property score signal 710 that is representative of a second property of the action/activity in the video feed could have values that range between −5 and 10.

Figure 8A:
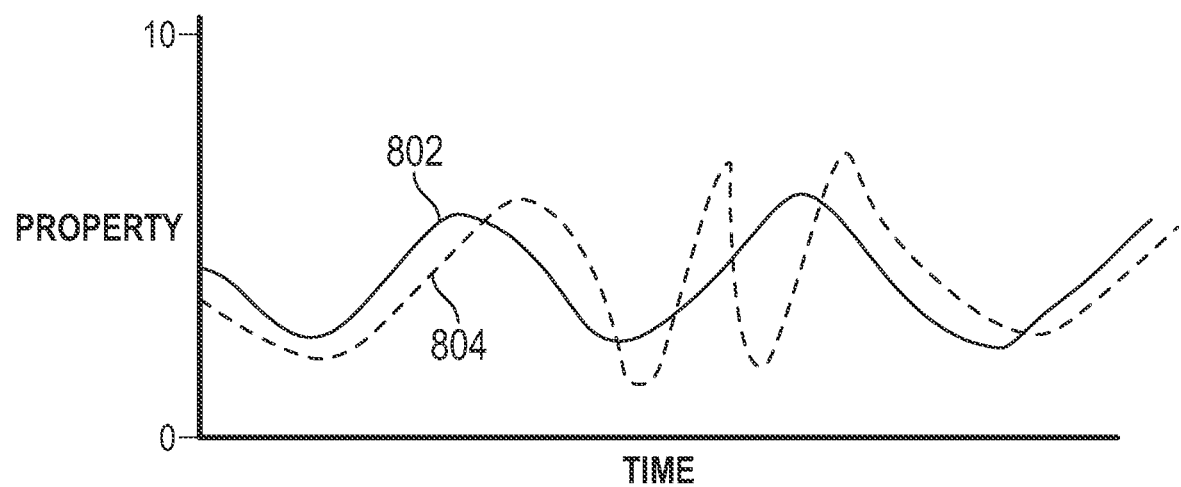
FIGS. 8A and 8B illustrate additional property signals that also can be used to generate action models.

FIG. 8A illustrates two different property score signals 802, 804 that are indicative of action/activity in a video feed. In this instance, the property being measured could be the same, but the property relates to what is being experienced by two different participants appearing in the video feed. This, the first property score signal 802 represents a first property that is being experienced by a first participant in the video feed, whereas the second property score signal 804 is representative of the same property as experienced by a second participant in the video feed.

In some embodiments, the action model generator 152 could use the first and second property score signals 802, 804 for the first and second participants to generate a single action model for the video feed. In alternate embodiments, the action model generator 152 could generate a first action model for the video feed based on the first property score signal 802 that is representative of the experience of the first individual appearing in the video feed, and the action model generator 152 also could generate a second action model for the video feed based on the second property score signal 804 that is representative of the experience of the second individual appearing in the video feed.

Figure 8B:
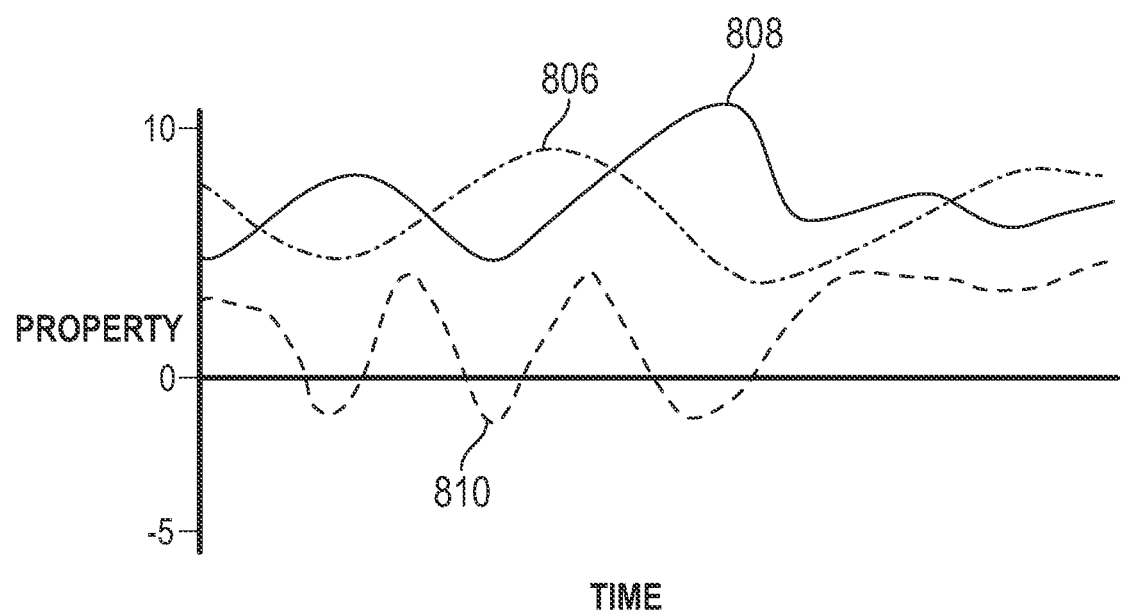

FIG. 8B illustrates that the property scoring unit 149 could generate a first property score signal 806 that is representative of a first property for a first participant appearing in a video feed, while at the same time: (1) generating a second property score signal 808 that is representative of the same first property for a second individual appearing in the video feed; and (2) generating a third property score signal 810 indicative of second different property as experienced by the second individual appearing in the video feed. As illustrated, the third property score signal could include negative values for the second property.

An action model generator 152 could then use the three property score signals 806, 808 and 810, alone or in combination to generate one or multiple different action models for the video feed.

Returning to the theme of analyzing adult entertainment video feeds, each of the property score signals illustrated in FIGS. 7A-7C, 8A and 8B could be representative of pleasure being experienced by a participant, with positive values being pleasure and negative values being pain. However, the analysis of adult entertainment video feeds is but one example, and he properties being expressed by the property value signals could relate to any sort of property of the action/activity appearing in a video feed.

The invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in a procedural, functional or object oriented programming language, such as Java®, Smalltalk or C++, and the like. However, the computer program code for carrying out operations of the present invention may also be written in conventional procedural programming language such as the "C" programming language, in a functional programming language such as Elm and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
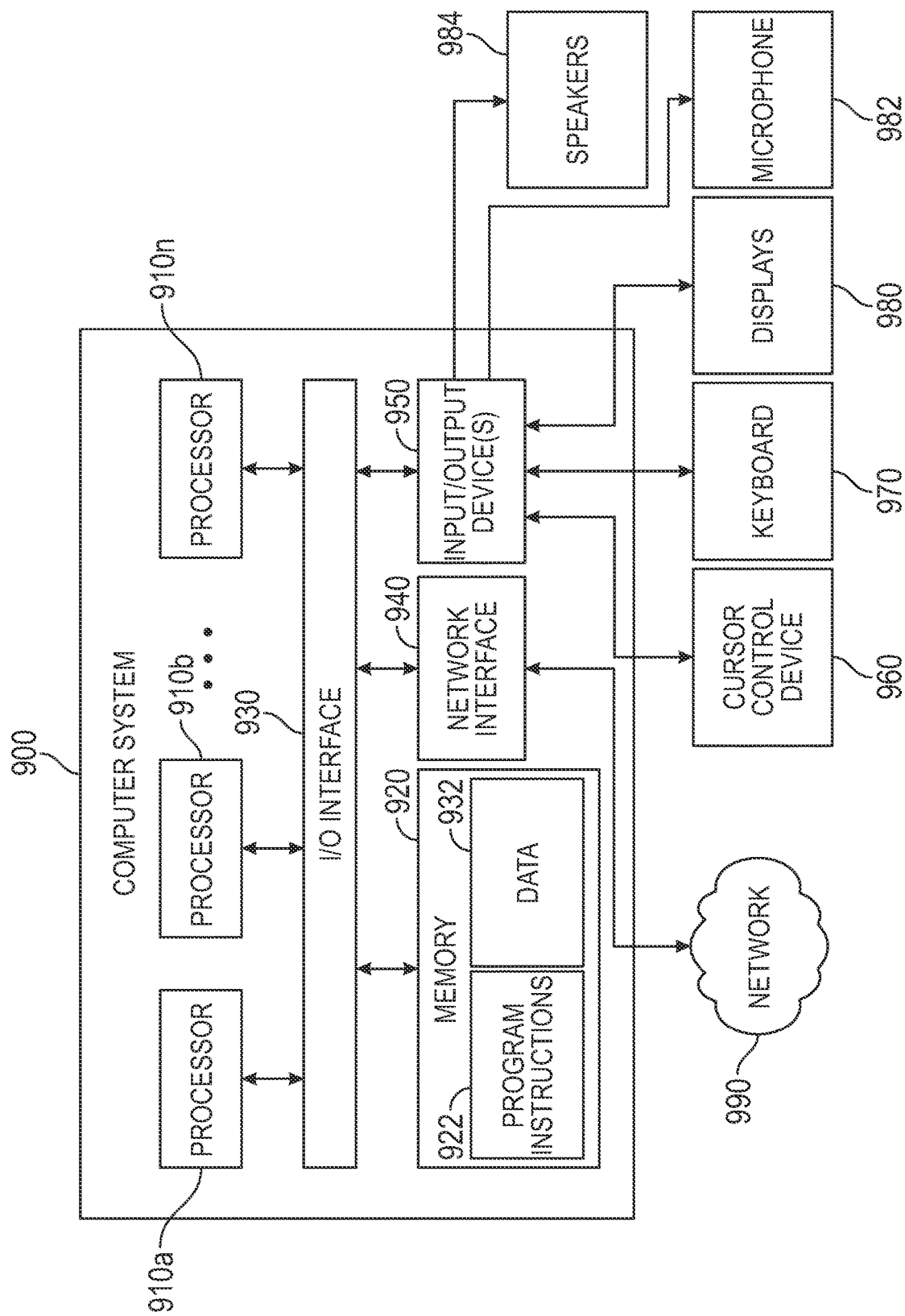
FIG. 9 is a diagram of a computer system and associated peripherals which could embody the disclosed technology and/or which could be used to practice methods embodying the disclosed technology.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, an input/output devices interface 950. The input/output devices interface 950 facilitates connection of external I/O devices to the system 900, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 800, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement a computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices interface 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

External input/output devices interface 950 may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of driving an electronic device that is configured to sexually stimulate an individual, comprising:
    obtaining an action model for a video feed that is being displayed where the action model is indicative of actions occurring in the video feed;
    identifying one or more actions that recently occurred in the video feed;
    predicting, in real-time, one or more actions that are likely to occur next in the video feed based on the action model and the one or more actions that recently occurred in the video feed;
    generating a drive signal that is to be used to drive an electronic device, where the drive signal is based on the predicted one or more actions, and where the drive signal is configured to drive the electronic device such that the electronic device is actuated in a way that is substantially synchronized with actions that occur in the video feed; and causing the drive signal to be applied to an electronic device that is configured to sexually stimulate an individual.

2. The method of claim 1, further comprising repeating the identifying, predicting, generating and causing steps on a periodic basis.

3. The method of claim 1, wherein the video feed comprises a live stream video feed.

4. The method of claim 1, wherein obtaining an action model comprises:

obtaining video information about the video feed; and generating an action model for the video feed based on the obtained video information.

5. The method of claim 4, further comprising generating a property score signal based on the obtained video information, where the property score signal is indicative of the value of a property of the action in the obtained video information, and wherein the generating step comprises generating the action model based, at least in part, on the generated property score signal.

6. The method of claim 5, wherein obtaining video information about the video feed comprises obtaining a plurality of frames of image data from the video feed, wherein generating a property score signal comprises assigning, for each of the plurality of frames of image data, a value of a property of the action depicted in the frame of image data, and wherein the property score signal is based on the assigned property values for the plurality of frames of image data.

7. The method of claim 6, wherein assigning a value of a property of the action depicted in the frames of image data comprises analyzing the frames of image data using artificial intelligence or machine learning techniques to assign property values to the plurality of frames of image data.

8. The method of claim 4, wherein generating an action model comprises generating the action model based on information about video feeds that are similar to the video feed that is being displayed.

9. The method of claim 4, wherein generating an action model comprises generating the action model using machine learning techniques and training data in the form of information about video feeds that are similar to the video feed being displayed.

10. The method of claim 4, wherein generating an action model comprises generating a plurality of action models for the video feed, wherein the first action model is configured to represent a first property of action in the video feed and the second action model is configured to represent a second different type of action in the video feed.

11. The method of claim 1, wherein identifying one or more actions that recently occurred in the video feed comprises analyzing the video feed to identify one or more types of action that recently occurred in the video feed.

12. The method of claim 1, wherein the generating step comprises generating a drive signal that is configured to cause the electronic device to actuate in a way that is synchronized with the actions of a specific participant in the video feed.

13. The method of claim 1, wherein the generating step comprises generating first and second drive signals, wherein the first drive signal is configured to cause a first electronic device to actuate in a way that is synchronized with the actions of a first participant in the video feed and wherein the second device drive signal is configured to cause a second electronic device to actuate in a way that is synchronized with the actions of a second participant in the video feed.

14. The method of claim 1, wherein the causing step comprises causing the drive signal to be applied to a plurality of electronic devices that are configured to sexually stimulate individuals.

15. The method of claim 1, wherein:

the generating step comprises:

generating a first drive signal that is configured to drive a first type of electronic device that is configured to provide a first type of sexual stimulation to an individual; and generating a second drive signal that is configured to drive a second type of electronic device that is configured to provide a second type of sexual stimulation an individual; and the causing step comprises:

causing the first drive signal to be applied to at least one of the first type of electronic device; and causing the second drive signal to be applied to at least one of the second type of electronic device.

16. A non-transitory computer-readable medium bearing instructions that, when performed by one or more processors of a computing device, cause the computing device to perform a method for driving an electronic device that is configured to sexually stimulate an individual, the method comprising:

obtaining an action model for a video feed that is being displayed where the action model is indicative of actions occurring in the video feed;

identifying one or more actions that recently occurred in the video feed;

predicting, in real-time, one or more actions that are likely to occur next in the video feed based on the action model and the one or more actions that recently occurred in the video feed;

generating a drive signal that is to be used to drive an electronic device, where the drive signal is based on the predicted one or more actions, and where the drive signal is configured to drive the electronic device such that the electronic device is actuated in a way that is substantially synchronized with actions that occur in the video feed; and causing the drive signal to be applied to an electronic device that is configured to sexually stimulate an individual.

17. The non-transitory computer-readable medium of claim 16, wherein the method further comprises repeating the identifying, predicting, generating and causing steps on a periodic basis.

18. The non-transitory computer-readable medium of claim 16, wherein the video feed comprises a live stream video feed.

19. The non-transitory computer-readable medium of claim 16, wherein obtaining an action model comprises:

obtaining video information about the video feed; and generating an action model for the video feed based on the obtained video information.

20. The non-transitory computer-readable medium of claim 19, wherein the method further comprises generating a property score signal based on the obtained video information, where the property score signal is indicative of the value of a property of the action in the obtained video information, and wherein the generating step comprises generating the action model based, at least in part, on the generated property score signal.

21. The non-transitory computer-readable medium of claim 20, wherein obtaining video information about the video feed comprises obtaining a plurality of frames of image data from the video feed, wherein generating a property score signal comprises assigning, for each of the plurality of frames of image data, a value of a property of the action depicted in the frame of image data, and wherein the property score signal is based on the assigned property values for the plurality of frames of image data.

22. The non-transitory computer-readable medium of claim 21, wherein assigning a value of a property of the action depicted in the frames of image data comprises analyzing the frames of image data using artificial intelligence or machine learning techniques to assign property values to the plurality of frames of image data.

23. The non-transitory computer-readable medium of claim 19, wherein generating an action model comprises generating the action model based on information about video feeds that are similar to the video feed that is being displayed.

24. The non-transitory computer-readable medium of claim 19, wherein generating an action model comprises generating the action model using machine learning techniques and training data in the form of information about video feeds that are similar to the video feed being displayed.

25. The non-transitory computer-readable medium of claim 19, wherein generating an action model comprises generating a plurality of action models for the video feed, wherein the first action model is configured to represent a first property of action in the video feed and the second action model is configured to represent a second different type of action in the video feed.

26. The non-transitory computer-readable medium of claim 16, wherein identifying one or more actions that recently occurred in the video feed comprises analyzing the video feed to identify one or more types of action that recently occurred in the video feed.

27. The non-transitory computer-readable medium of claim 16, wherein the generating step comprises generating a drive signal that is configured to cause the electronic device to actuate in a way that is synchronized with the actions of a specific participant in the video feed.

28. The non-transitory computer-readable medium of claim 16, wherein the generating step comprises generating first and second drive signals, wherein the first drive signal is configured to cause a first electronic device to actuate in a way that is synchronized with the actions of a first participant in the video feed and wherein the second device drive signal is configured to cause a second electronic device to actuate in a way that is synchronized with the actions of a second participant in the video feed.

29. The non-transitory computer-readable medium of claim 16, wherein the causing step comprises causing the drive signal to be applied to a plurality of electronic devices that are configured to sexually stimulate individuals.

30. The non-transitory computer-readable medium of claim 16, wherein:
the generating step comprises:
generating a first drive signal that is configured to drive a first type of electronic device that is configured to provide a first type of sexual stimulation to an individual; and
generating a second drive signal that is configured to drive a second type of electronic device that is configured to provide a second type of sexual stimulation an individual; and
the causing step comprises:
causing the first drive signal to be applied to at least one of the first type of electronic device; and
causing the second drive signal to be applied to at least one of the second type of electronic device.

* * * * *